United States Patent
Kohda et al.

(10) Patent No.: US 7,187,372 B2
(45) Date of Patent: Mar. 6, 2007

(54) IMAGE DATA TRANSMISSION APPARATUS AND METHOD FOR IMAGE DISPLAY SYSTEM

(75) Inventors: Takenori Kohda, Yamato (JP); Sanehiro Furuichi, Kawasaki (JP); Moriyoshi Ohara, Yokohama (JP); Kei Kawase, Sagamihara (JP)

(73) Assignee: AU Optronics Corporation, Hsinchu (TW)

( * ) Notice: Subject to any disclaimer, the term of this patent is extended or adjusted under 35 U.S.C. 154(b) by 424 days.

(21) Appl. No.: 10/471,071

(22) PCT Filed: Mar. 5, 2002

(86) PCT No.: PCT/GB02/00934

§ 371 (c)(1),
(2), (4) Date: Sep. 5, 2003

(87) PCT Pub. No.: WO02/071380

PCT Pub. Date: Sep. 12, 2002

(65) Prior Publication Data

US 2004/0125110 A1 Jul. 1, 2004

(30) Foreign Application Priority Data

Mar. 6, 2001 (JP) .............................. 2001-062571

(51) Int. Cl.
*G09G 5/00* (2006.01)
(52) U.S. Cl. ....................... 345/204; 345/571; 345/574
(58) Field of Classification Search ................. 345/1.2, 345/87–89, 98, 204, 571, 574
See application file for complete search history.

(56) References Cited

U.S. PATENT DOCUMENTS 5,408,247 A * 4/1995 Enomoto et al. ........... 345/100

(Continued)

FOREIGN PATENT DOCUMENTS

EP     1 107 224 A    6/2001

(Continued)

OTHER PUBLICATIONS

Ohara et al., Digital Link: High Functional Digital Monitor Interface, SID Symposium Digest of Technical Papers, vol. 30, No. 1, p. 118-121 (1999).

(Continued)

*Primary Examiner*—Amr A. Awad
*Assistant Examiner*—Steven Holton
(74) *Attorney, Agent, or Firm*—David Aker

(57) ABSTRACT

An image display system comprises: a transmission device (PC) 10, for transmitting image data upon receiving a drawing command from an OS or an application; and a receiving monitor 40, for displaying, on a high-resolution panel 41, image data received via a monitor cable 39, wherein the transmission device 10 includes a drawing command analysis device 20, for detecting an area on a screen wherein the content is changed by the drawing command, and for employing the detected area to calculate an area to be transmitted, and a graphics card 12, for transmitting a packet that includes the calculated area to be transmitted, and control data provided as header data for the area to be transmitted, and wherein the receiving monitor 40 includes a packet reception device 50, for analyzing the header data in the received packet and for, based on the header data, rendering image data in an internally provided frame memory.

5 Claims, 10 Drawing Sheets

U.S. PATENT DOCUMENTS

| | | | |
|---|---|---|---|
| 5,905,483 A * | 5/1999 | Yuki | 345/98 |
| 6,014,133 A | 1/2000 | Yamakado et al. | |
| 6,046,718 A | 4/2000 | Suzuki et al. | |
| 6,734,863 B1 * | 5/2004 | Ikeda | 345/531 |
| 6,989,825 B2 * | 1/2006 | Naito et al. | 345/204 |
| 2001/0043206 A1 | 11/2001 | Naito et al. | |
| 2002/0075399 A1 * | 6/2002 | Nemiroff et al. | 348/390.1 |

FOREIGN PATENT DOCUMENTS

| | | |
|---|---|---|
| EP | 1 156 469 A | 11/2001 |
| JP | 10-021044 | 1/1998 |
| JP | 2001-331162 | 11/2001 |
| JP | 2002-032063 | 1/2002 |
| JP | 2002-175065 | 6/2002 |

OTHER PUBLICATIONS

Mamiya et al., Digital PV Links for a Next Generation Video Interface, and Its System Architecture, SID Symposium Digest of Technical Papers, vol. 31, No. 1, p. 38-41 (2000).

J. Mamiya et al, An overview of Digital PV Link as Next Generation Video Interface, IEICE Electronics Convention Papers 2, p. 52.

Kasai et al., Digital Packet Video Link for Super High Resolution Display, IDW'00 proceedings of the Seventh International Display Workshops, p. 321-324.

* cited by examiner

IMAGE DATA TRANSMISSION APPARATUS AND METHOD FOR IMAGE DISPLAY SYSTEM

This application, filed under 35 U.S.C. §371, claims priority from International Patent Application PCT/GB02/00934 filed on Mar. 5, 2002 and published in English under PCT Article 21(2), which in turn claims priority from Japanese Patent application 2001-062571 filed on Mar. 6, 2001.

FIELD OF THE INVENTION

The present invention relates to an image transfer system, for displaying an image on a display panel, and more particularly to an image transfer system, etc., for enabling, with a small change, the display of an image on a high resolution, high image quality display panel.

BACKGROUND ART

Generally, image data for displaying an image is processed by the graphics controller of a host apparatus, a personal computer (PC), and the resultant image data is transmitted to a display device. For a CRT, which currently is the main device used as a monitor (panel), UXGA (Ultra Extended Graphics Array) (1600×1200 dots) is the preeminent available image size. With this image size, a conventional graphics controller that outputs raster data can easily display an image, and only one monitor cable is required for the transmission of the image data.

As the development of display devices, such as liquid crystal displays (LCDS), has progressed, however, great differences have appeared in the processing capabilities of host apparatuses and display devices. For example, the display resolutions available with QXGA (Quad Extended Graphics Array) (2048×1536 dots) capable displays have recently been surpassed by those of large, higher-resolution monitors (panels), e.g., the high-resolution (super high resolution) QSXGA (Quad Super Extended Graphics Array) (2560×2048 dots) and QUXGA (Quad Ultra Extended Graphics Array) (3200×2400 dots) monitors, but while these super high resolution monitors are gradually reaching the point where they can be used for practical applications, system power and graphic controller capabilities have not kept pace and can not use the super high resolution monitors to present satisfactory displays. That is, at present, driving one of the above described monitors is difficult for a conventional graphics system comprising a set consisting of a monitor cable and a raster transfer graphics card, which is available and will, undoubtedly, continue to be employed.

With one large high-resolution monitor driving method, multiple sets of graphics cards and cables are prepared, and not only is the monitor changed but also an OS or a driver, so that a single raster input panel is handled as multiple raster input panels. However, according to this method, since the number of graphics cards that can be mounted on a PC is limited physically, it is difficult for drawing engines mounted on the individual graphics cards to be operated synchronously. As a result, not only is it difficult to provide a satisfactory image quality for a full-screen display for a moving picture, but also it is difficult to do this for a limited application, such as DTP (Desk Top Publishing). In addition to the image quality problem, for system configuration large investments will be required of graphics card and monitor makers, and of users.

Another method has been studied whereby a frame memory is mounted on a high-resolution panel or a monitor connection device that is positioned between a high-resolution panel and a host apparatus. When a frame memory is provided for a monitor, a specific drawing command is not processed by the host, and before image data is rendered it is transmitted to the monitor whereby it is translated to perform drawing. Thus, the amount of data to be transmitted can be reduced. One further system has been studied that is connected via a network to a client monitor, for example, such as a PC that includes a central processing unit, a communication device and a drawing device, and that outputs, to the client monitor, the results of an application executed by a server. Since this system can considerably reduce the amount of data that must be transmitted along a communication path constituted by a network, ethernet can be selected for use as a communication path.

As is described above, when frame memories are provided for monitors, displays on high-resolution panels are enabled, even when there are no drastic improvements in the functions provided hosts. However, the current techniques require that monitors function the same as common PCs. Thus, when the level of the functions (the same functions as PCs) required of monitors can be reduced, costs can be reduced considerably. Especially when compatibility with currently employed raster monitors can be obtained and conventional graphics raster transfer systems can be employed, high-resolution panels can be easily driven without additional expensive investments being required, and it can be further expected that large, high-resolution panels will be widely used.

To resolve the above described technical problems, it is one object of the present invention to drive a large, high-resolution monitor (panel) merely by making an extremely small change to a conventional system.

It is another object of the present invention to drive, within a limited transfer band, a large, high-resolution monitor that conventionally can not be supported.

SUMMARY OF THE INVENTION

To achieve the above objects, according to one aspect of the present invention, a delta transmission system is employed wherein a frame memory is incorporated in an image receiving monitor, and a transmission source transmits only delta information. Specifically, an image display system according to the present invention comprises: a transmission device, for transmitting image data based on a predetermined drawing command issued by an OS or an application; and a reception monitor, for displaying received image data on a high-resolution panel, wherein the transmission device includes area detection means, for detecting an area wherein a change occurs on a screen in accordance with the drawing command, transmission target area calculation means, for calculating, based on the detected area, a target area to be transmitted, and packet transmission means, for transmitting a packet including the target area that is obtained and control data for the target area as header data, and wherein the receiving monitor includes analysis means, for analyzing the control data received from the received packet, a frame memory, for rendering image data based on the analyzed control data, and display means, for displaying, on a high-resolution panel, the image data rendered in the frame memory.

Regardless of whether a change occurs on the screen, the packet transmission means repetitively transmits a packet including the same screen data. For example, if the image is periodically output to the screen, regardless of whether a drawing command is issued, this arrangement is preferable because a transfer error can be recovered.

According to another aspect of the invention, an image data transmission apparatus comprises: drawing area detection means, for analyzing a drawing command issued by an OS or an application and for detecting an area wherein drawing is performed; rectangular area calculation means, for calculating, based on the detected area, a rectangular area to be transmitted to a monitor; and packet transmission means, for transmitting a packet including the obtained rectangular area and control data for the rectangular area as header data.

The rectangular area obtained by the rectangular area calculation means is an area that encloses multiple areas that are changed. This arrangement is superior because when the area to be transmitted is changed the overhead can be reduced. Further, a display priority level for image data is determined, and image data having a high priority level is first transmitted, while image data having a low priority level is transmitted only in a full screen update mode, for example, for updating the full screen.

The packet transmission means can employ a hardware panning function provided for a graphics card for reading image data from a frame memory, and for transmitting the image data, and can transmit only a rectangular area obtained by the rectangular area calculation means. The hardware panning function changes the setting of a controller (CRT controller) for reading data from a specific location in a frame memory.

Further, the packet transmission means can employ a hardware cursor function provided for a graphics card, and can transmit a packet including control data and a rectangular area. This hardware cursor function stores cursor data in the undisplayed area of the frame memory, and reads and synthesizes the cursor data when the image data is read. In this invention, control data, such as header data, is written instead of the cursor image data.

According to one more aspect of the invention, an image data transmission apparatus comprises: a drawing command analysis device, for analyzing a drawing command and for detecting an area wherein drawing has occurred; and a graphics card, for transmitting image data to a receiving monitor, wherein the drawing command analysis device includes a drawing command analysis unit, for determining whether a change occurred on a screen upon the reception of a drawing command, and for outputting drawing data, a transmission target area controller, for outputting, upon receiving the drawing data, area data to be transmitted, and a graphics device driver, for outputting to a graphics card, based on the area data, a drawing command and control data.

The graphics card includes: a frame memory; a drawing engine, for rendering image data for the frame memory, and a controller, for transmitting, to the receiving monitor, image data rendered in the frame memory, wherein the controller reads image data from the frame memory based on control data that is output by the graphics device driver, and transmits, to the receiving monitor, image data located in an area corresponding to the area data.

According to a further aspect of the invention, an image display device comprises: a packet analysis unit, for extracting header data from a received packet; a header analysis unit, for identifying, based on the header data, the location of a frame memory whereat image data is written; and a panel controller, for reading the image data from the frame memory, and for displaying the image data on a panel at a location obtained by the analyzation. This is a high-resolution panel (e.g., a panel having a resolution exceeding that of a QXGA (Quad Extended Graphics Array) (2048×1536 dots) panel for a DVI (Digital Visual Interface) cable) for which, to display image data in a raster form, the amount of data transmitted exceeds the capacity of a cable along which a packet is transmitted by a transmission device, and display quality can not help but be deteriorated.

The present invention can also be provided as a program that permits a computer to perform predetermined functions. These functions include: a drawing command analysis function, for receiving a drawing command and detecting an area where drawing has occurred; an area calculation function, for calculating an area to be transmitted; and an area control function, for outputting, based on the obtained area to be transmitted, outputting control data that is provided for a controller that reads image data from a frame memory and transmits the image data.

The present invention can also be provided as a program that permits a computer to perform: a function for reading, from a display area in a frame memory, image data for a rectangular area including an area that is changed in accordance with a drawing command; a function for reading, from an undisplayed area in the frame memory, header data that includes positional information for the rectangular area; and a function for synthesizing image data, read from the display area, and header data, read from the undisplayed area, and outputting the resultant image data.

These computer program can be transmitted by a program transmission apparatus, via a network, to a PC, which is an image data transmission apparatus. This program transmission apparatus can comprise: storage means, such as a CD-ROM, a DVD, a memory or a hard disk, for storing the above program; and transmission means, for reading the program from the storage means, and for transmitting the program to the apparatus that executes the program, via a connector and a network, such as the Internet or a LAN.

The above described computer program can be provided directly to a PC by using a storage medium, such as a CD-ROM or a DVD. The computer-readable program need only be stored on the storage medium.

BRIEF DESCRIPTION OF THE DRAWINGS

The preferred embodiment of the present invention will now be described in detail while referring to the accompanying drawings.

FIG. 1 is a diagram for explaining the general configuration of an image display system according to one embodiment of the invention. The image display system of the embodiment comprises: an image data transmission device 10, which serves as a host (transmission source), a PC; and a receiving monitor 40, an image display device. The transmission device 10 and the receiving monitor 40 are connected by a conventional monitor cable 39, a digital monitor cable, such as a DVI (Digital Visual Interface). The transmission device 10 and the receiving monitor 40 may be provided as separate units and be connected by an external monitor cable 39, or may be incorporated in a single unit that constitutes a computer or an image display device.

Figure 1:
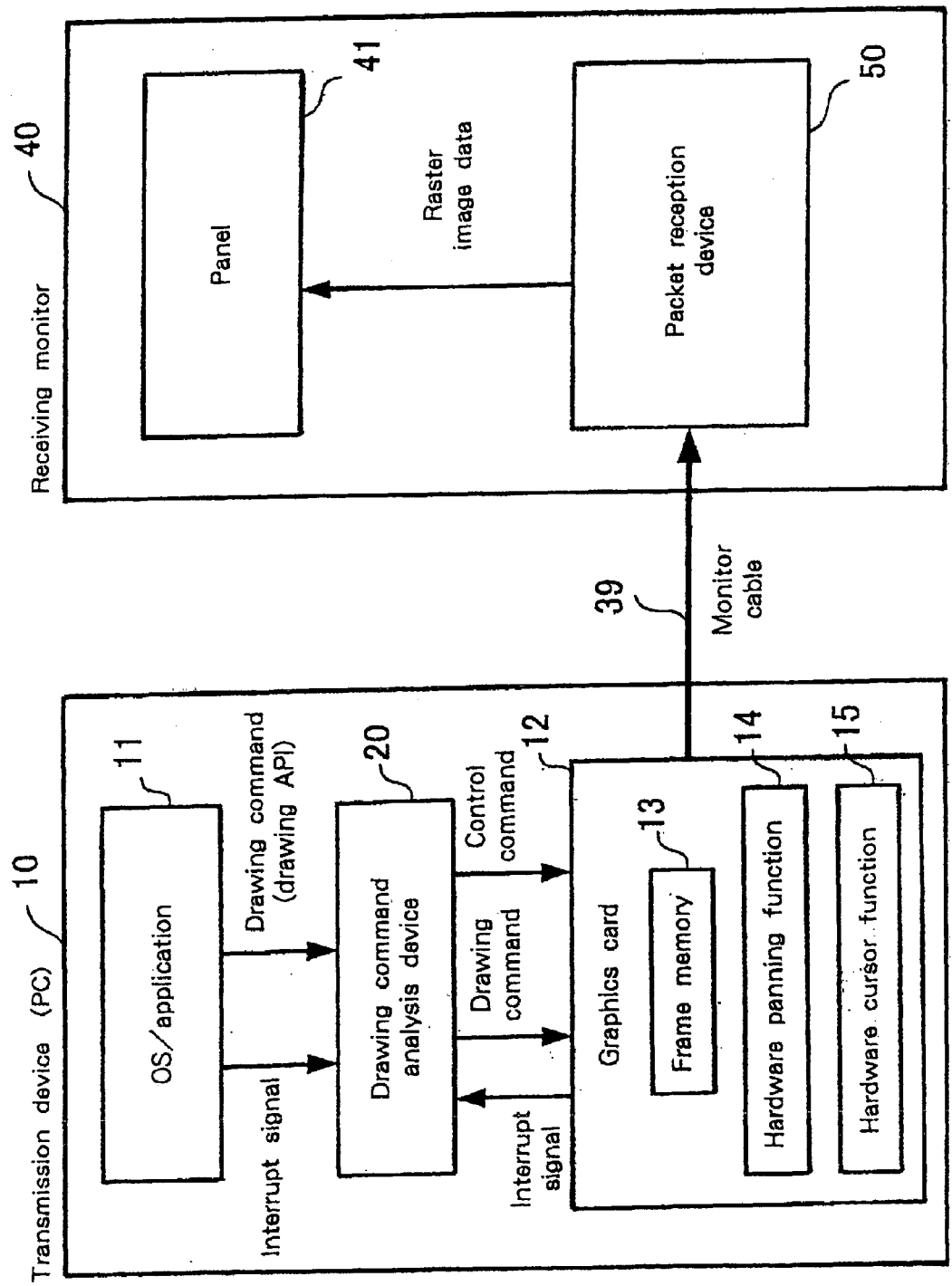
FIG. 1 is a diagram for explaining the overall configuration of an image display system according to one embodiment of the invention.

As a common PC, the transmission device 10 includes a central processing unit, a memory and an HDD (none of them shown). In addition, the transmission device 10 includes an OS/application 11, which is an OS (Operating System) or an application usually employed by a PC; a graphics card 12, which is a common hardware component; and a drawing command analysis device 20 that is the feature of this embodiment. One function of the transmission device 10 in this embodiment is the extraction of an area that has been changed, while another is the transmission of header data that includes data pertinent to the changed area and data for image control.

The OS/application 11 outputs, to the drawing command analysis device 20, an interrupt signal and a drawing command, which is constituted by a drawing API (Application Program Interface), while the drawing command analysis device 20 analyzes the received drawing command. The graphics card 12 outputs, to the drawing command analysis device 20, an interrupt signal based on a vertical synchronization signal (VSYNC). Further, the drawing command analysis device 20 outputs, to the graphics card 12, a drawing command, and a control command that is constituted by predetermined control data. Upon receiving these commands, the graphics card 12 transmits image data to the receiving monitor 40.

The graphics card 12 includes a frame memory 13 for which drawing is performed, a hardware panning function 14 and a hardware cursor function 15. The hardware panning function 14 employed in this embodiment initially displays a virtual display screen that is larger in size than the available display of a monitor, and extracts the location of a mouse cursor as a starting point. That is, the hardware panning function 14 determines an area of the frame memory 13 to be output, and based on a command issued by the drawing command analysis device 20, each time a vertical synchronization signal is received the hardware panning function 14 changes the setting of a CRTC that controls the area data (the starting position, the size, etc.) to be transmitted and outputs only a desired rectangular area. The timing for changing the area need not always match the vertical synchronization, and this change can be performed upon the reception of a horizontal synchronization signal or another interrupt signal.

The hardware cursor function 15 stores cursor data in the undisplayed area of the frame memory 13 and, when a CRTC (CRT controller) reads image data from the frame memory 13, synthesizes image data and cursor data and outputs the resultant data. In this embodiment, based on a command from the drawing command analysis device 20, header data is written instead of cursor image data, and as a result, a header is included in an image received by the reception monitor 40. The data in the frame memory 13, however, need not be altered, and software is used to display the cursor.

The receiving monitor 40 includes a panel 41, a large, high-resolution panel, such as a QUXGA panel, and a packet reception device 50 for receiving image data from the transmission device 10 via the monitor cable 39. The packet reception device 50 outputs, to the panel 41, raster image data obtained by conversion. The receiving monitor 40 used for this embodiment, a monitor having a large, high-resolution panel, has as one function the analyzation of the control data added to the received data, and as another function, the display of images on a panel.

Figure 2:
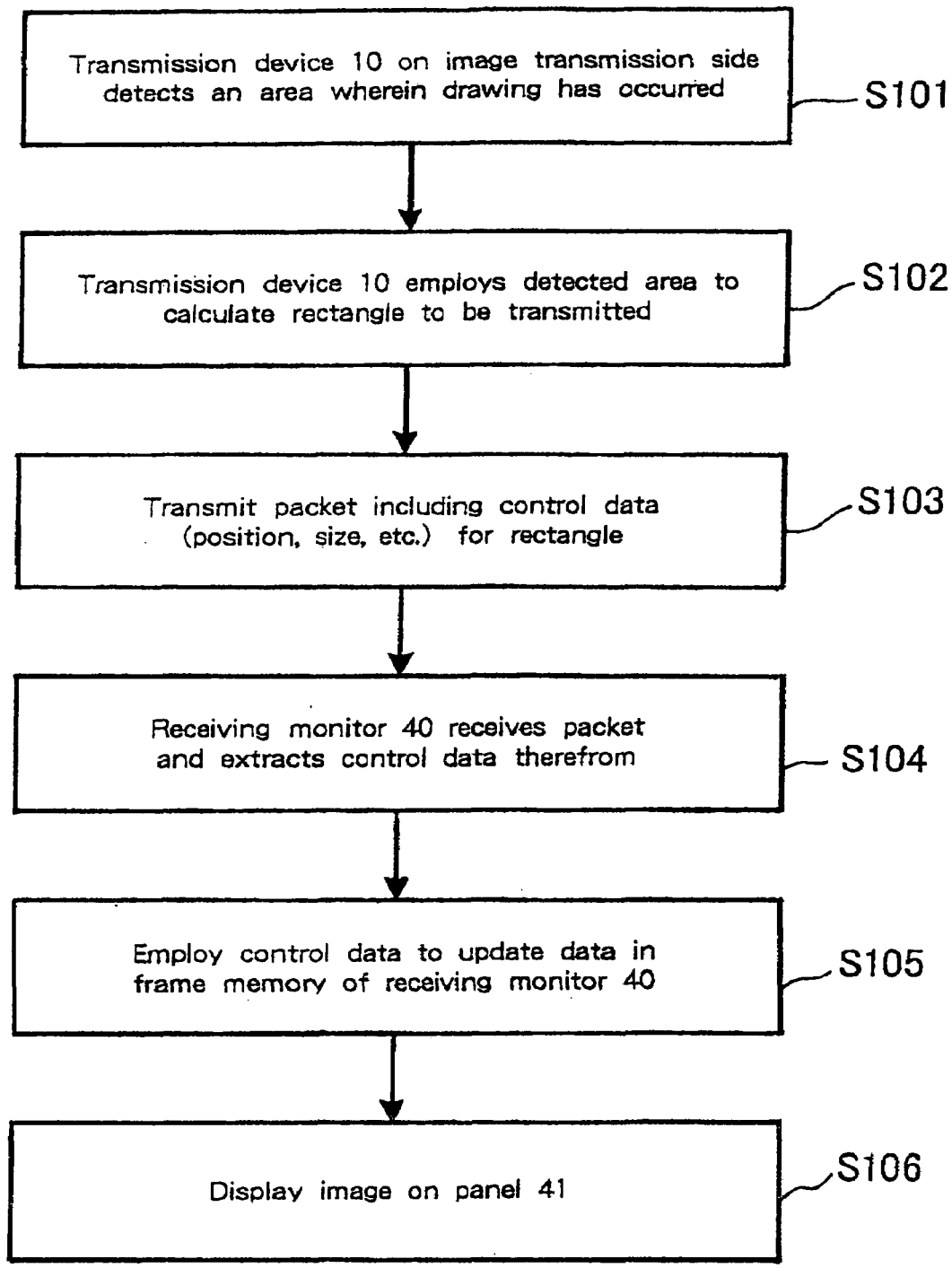
FIG. 2 is a flowchart showing the main processing performed by the image display system according to the embodiment.

In FIG. 2, the flowchart showing the main processing performed by the image display system of this embodiment is provided in order make it easy to understand the embodiment. First, the transmission device 10 for transmitting an image detects an area wherein drawing has occurred (step 101). The transmission device 10 then employs the detected area to calculate a rectangular area to be transmitted (step 102). Thereafter, the transmission device 10 adds control data (the position, the size, etc.) describing a rectangle as a header to the packet, and transmits the resultant packet (step 103). The receiving monitor 40 receives the packet, and extracts control data from the packet (step 104). Then, the extracted control data is employed to update data in the frame memory of the receiving monitor 40 (step 105). Thereafter, the image is displayed on the panel 41 (step 106). An explanation will now be given for the configuration used for this embodiment to perform this processing sequence.

Figure 3:
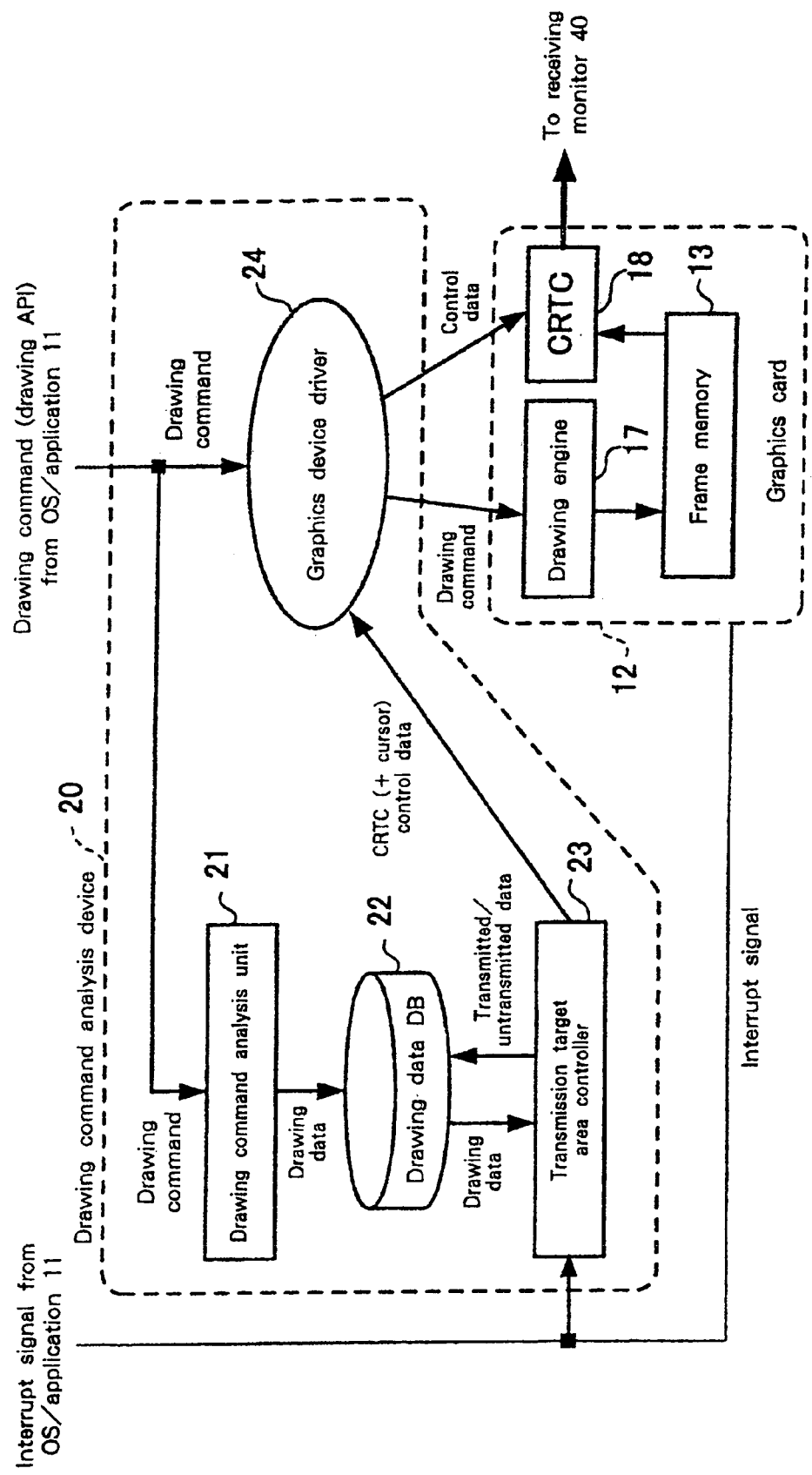
FIG. 3 is a diagram for explaining a drawing command analysis device according to the embodiment.

FIG. 3 is a diagram for explaining the drawing command analysis device 20 in this embodiment. The drawing command analysis device 20 is installed, for example, as a software module in the transmission device 10, and is executed by using the hardware resources of the transmission device 10. In this embodiment, the drawing command analysis device 20 includes a drawing command analysis unit 21, for analyzing a drawing command (drawing API) received from the OS/application 11, and for, based on the analysis results, calculating the drawing position of the frame memory 13; and a drawing data DB (database) 22 for storing drawing data received from the drawing command analysis unit 21. The drawing command analysis device 20 further includes a transmission target area controller 23 for obtaining drawing data from the drawing data DB 22 once an interrupt signal has been received, and for calculating control data for the CRTC (CRT controller). The control data obtained by the transmission target area controller 23 is transmitted to a graphics device driver 24, and predetermined data is fed back to the drawing data DB 22. Based on the various data that are received, the graphics device driver 24 transmits a drawing command and control data to the graphics card 12.

The graphics card 12 includes a drawing engine 17, for receiving a drawing command from the graphics device driver 24 and for performing drawing in the frame memory 13; and a CRTC 18, for reading image data from the frame memory 13, and for controlling area data to be transmitted to the receiving monitor 40. For these arrangements, the graphics card 12 receives a drawing command and control data from the graphics device driver 24, and carries out the hardware panning function 14 and the hardware cursor function 15.

Figure 4:
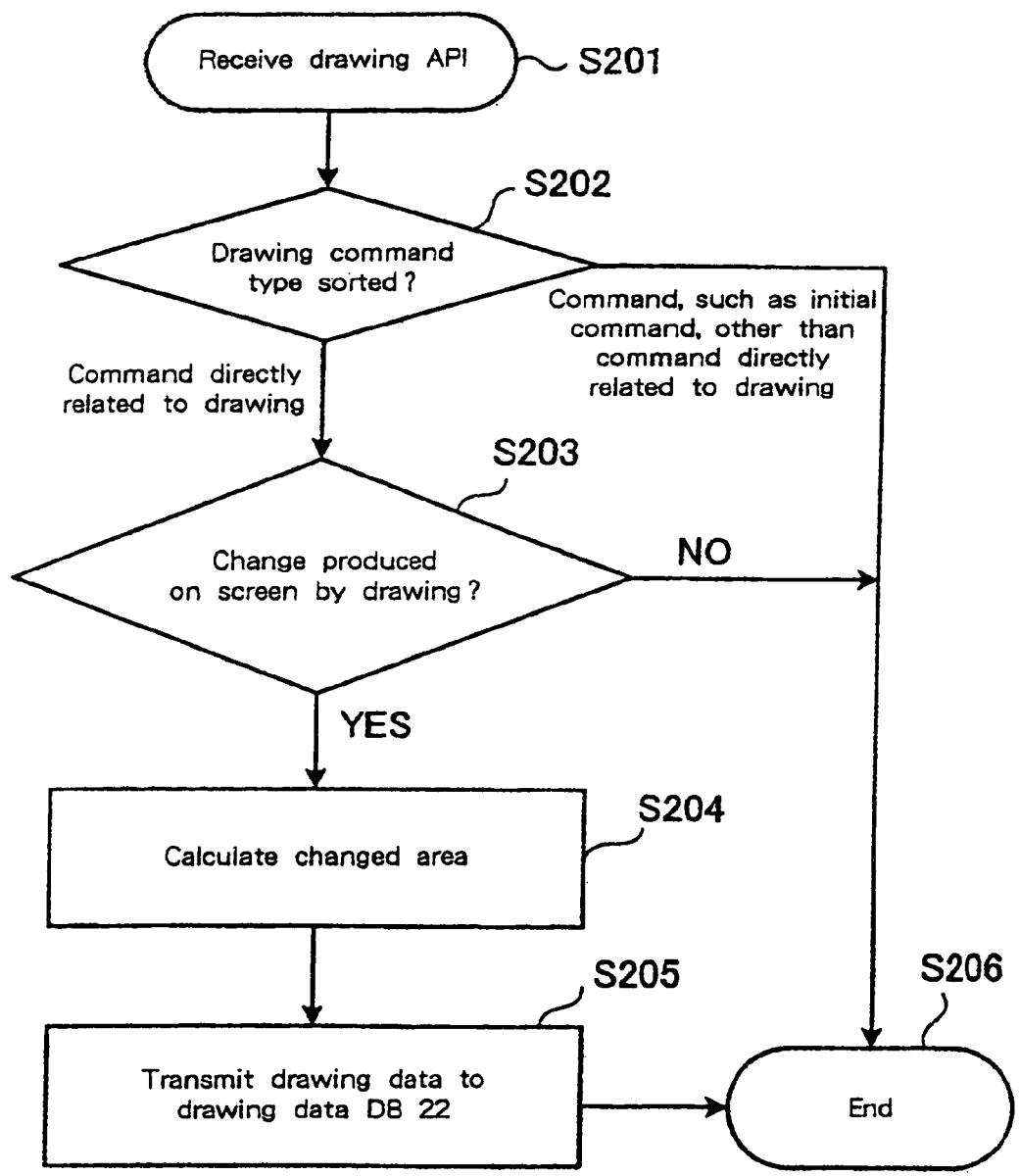
FIG. 4 is a flowchart showing the processing performed by a drawing command analysis unit.

FIG. 4 is a flowchart showing the processing performed by the drawing command analysis unit 21 explained while referring to FIG. 3. A drawing API, which is a drawing command, is received (step 201), and the drawing command analysis unit 21 sorts the types of drawing commands (step 202). When the drawing command is a command, such as an initial command, that is not directly related to drawing, the process at this step need not be performed, and the entire processing sequence is terminated (step 206). When the drawing command is a command directly related to drawing, a check is performed to determine whether a change on the screen has occurred that is attributable to drawing (step 203). When no change has occurred on the screen, new drawing data need not be calculated and the processing is terminated (step 206). When a change has occurred on the screen, a change area is calculated (step 204). Thereafter, the drawing data is transmitted to the drawing data DB 22 (step 205), and the processing of the drawing command analysis unit 21 is terminated (step 206). The drawing data transmitted to the drawing data DB 22 at step 205 can be information, for example, concerning the coordinates of the upper left corner of a rectangle that includes a drawing figure and information for the size of the figure. The coordinate information concerning the upper let corner of a rectangle and other information can be employed as the drawing data. Further, when the size of image data is so large it can not be drawn at one time, the drawing data can be information for an area to be/not yet to be transmitted.

Figure 5:
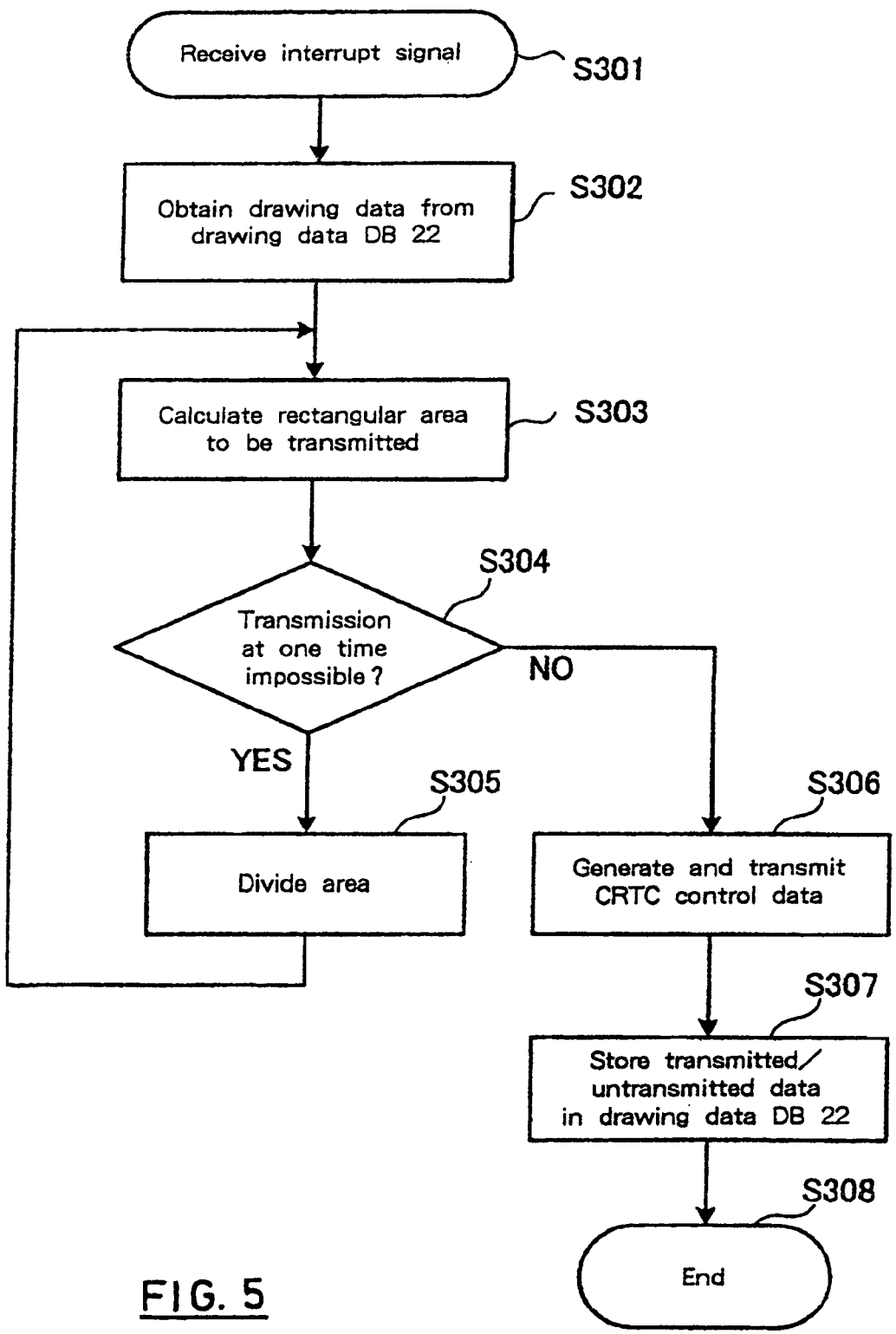
FIG. 5 is a flowchart showing the processing performed by a transmission target area controller.

FIG. 5 is a flowchart showing the processing performed by the transmission target area controller 23 explained while referring to FIG. 3. The transmission target area controller 23 starts the processing upon receiving an interrupt signal (step 301). This interrupt signal is, for example, a timing interrupt/input interrupt signal output by the OS/application 11, or a horizontal sync signal (HSYNC) or a vertical synchronization signal (VSYNC) output by the graphic card 12. The transmission target area controller 23 obtains drawing data from the drawing data DB 22 (step 302), and calculates a rectangular area to be transmitted (step 303). In this calculation, for example, a rectangular area including multiple areas that are not yet transmitted. A check is performed to determine whether the entire rectangular area can be transmitted at one time (step 304). When this is not possible, this area is subdivided (step 305), and program control returns to step 303 for the calculation of a rectangular area to be transmitted. That is, in this embodiment, when the size of a rectangle to be transmitted exceeds the display size enabled by using the CRTC 18, or exceeds the transmission size enabled due to the band width of the monitor cable 39, a rectangular area that can not in its entirety be transmitted at one time is subdivided.

When it is ascertained at step 304 that the entire rectangular area can be transmitted at one time, CRTC control data is generated and transmitted to the graphics device driver 24 (step 306). At this time, the CRTC control data may include hardware cursor control data. Information such as that related to the transmission/non-transmission of an area, which is applicable to the area to be transmitted and which is obtained as a result of the calculation performed for the CRTC control data, is fed back to the drawing data DB 22 (step 307). Thereafter, the processing performed by the transmission target area controller 23 is terminated (step 308).

Figure 6:
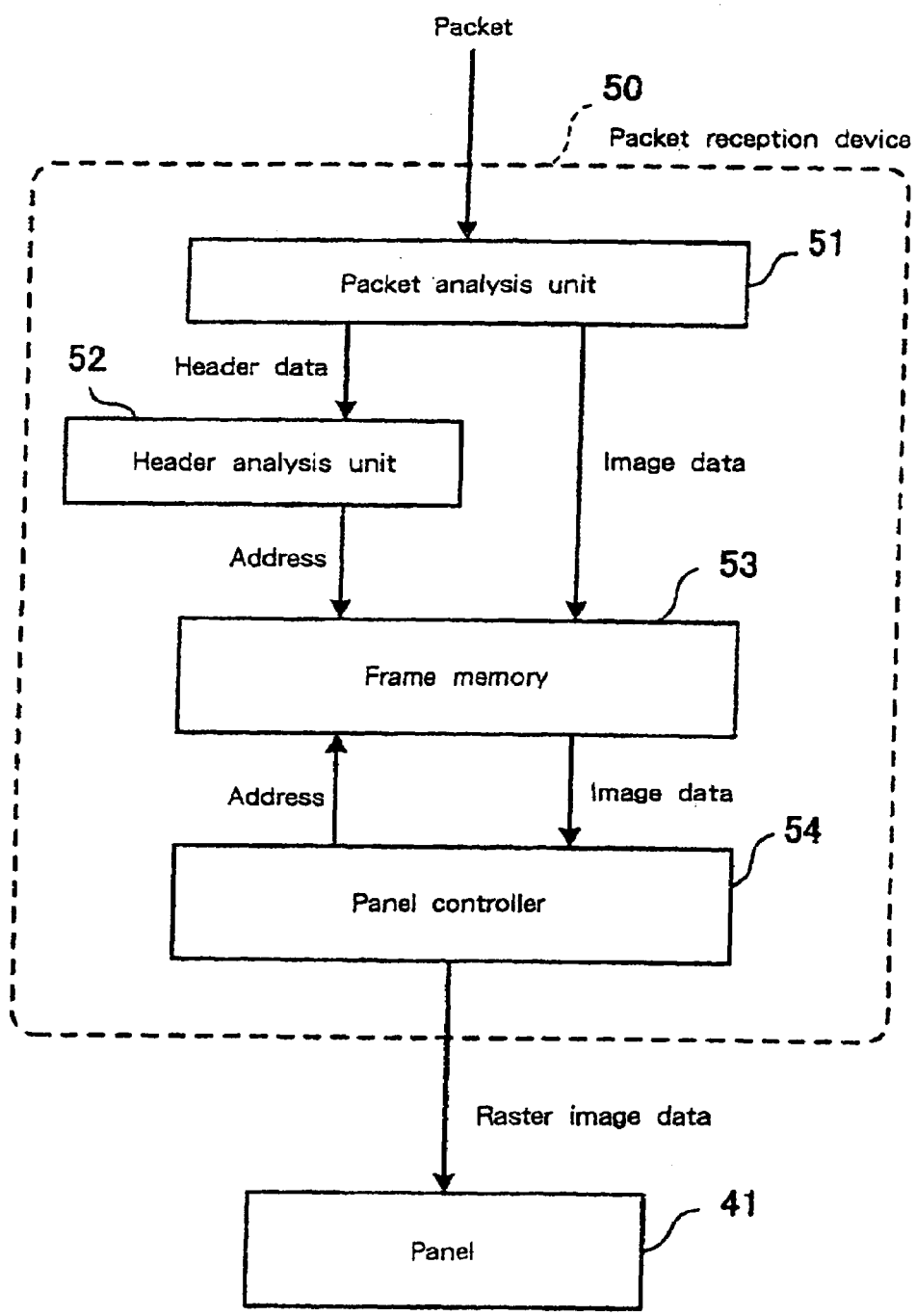
FIG. 6 is a block diagram showing the arrangement of a packet reception device in a receiving monitor.

FIG. 6 is a block diagram showing the configuration of the packet reception device 50 in the receiving monitor 40. As is shown in FIG. 6, the packet reception device 50 includes: a packet analysis unit 51, for separating, into header data and other data, a packet that is received from the transmission device 10 via the monitor cable 39; a header analysis unit 52, for receiving header data obtained by the packet analysis unit 51 and for obtaining (identifying) the location in the frame memory 53 whereat the image data portion is to be written; and a frame memory 53, for writing image data based on address (location) information obtained from the header analysis unit 52; and a panel controller 54, for reading image data from the frame memory 53, and for transmitting the image data as raster image data to the panel 41.

An explanation will now be given for packet data to be exchanged, and a method for generating this packet data.

FIGS. 7A to 7C are diagrams for explaining a packet data generation method. In FIG. 7A, the configuration of the frame memory 13 for the graphics card 12 of the transmission device 10 is shown. The frame memory 13 has a displayed area 13-1 and an undisplayed area 13-2. When, for example, the size allocated for the frame memory is 64 M bytes and the display area 13-1 wherein screen data are stored is 36 M bytes, the remaining undisplayed area 13-2 is 28 M bytes. In the displayed area 13-1, a rectangle is drawn that includes an area that was changed by the drawing data obtained by the drawing command analysis device 20. In the undisplayed area 13-2, header data is written. In FIG. 7B, the scanning start location of the frame memory 13 is moved forward at distance equivalent to one line, and the hardware cursor is positioned at the upper left of the original rectangle. In FIG. 7C, a packet is obtained by the image and the header in the frame memory 13.

Figure 8:
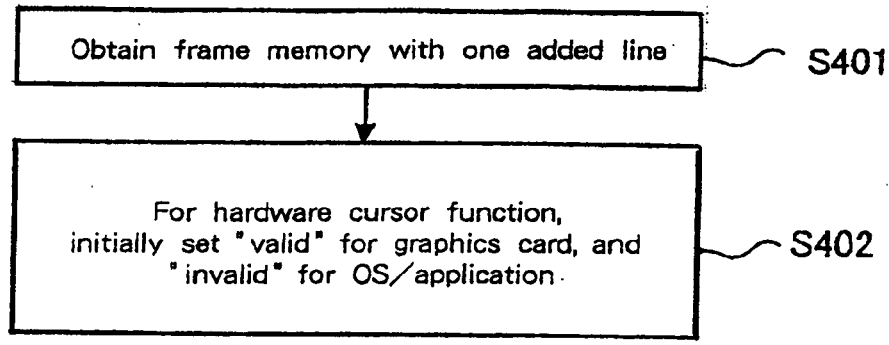
FIGS. 8A and 8B are flowcharts showing the packet data generation processing.
Figure 8:
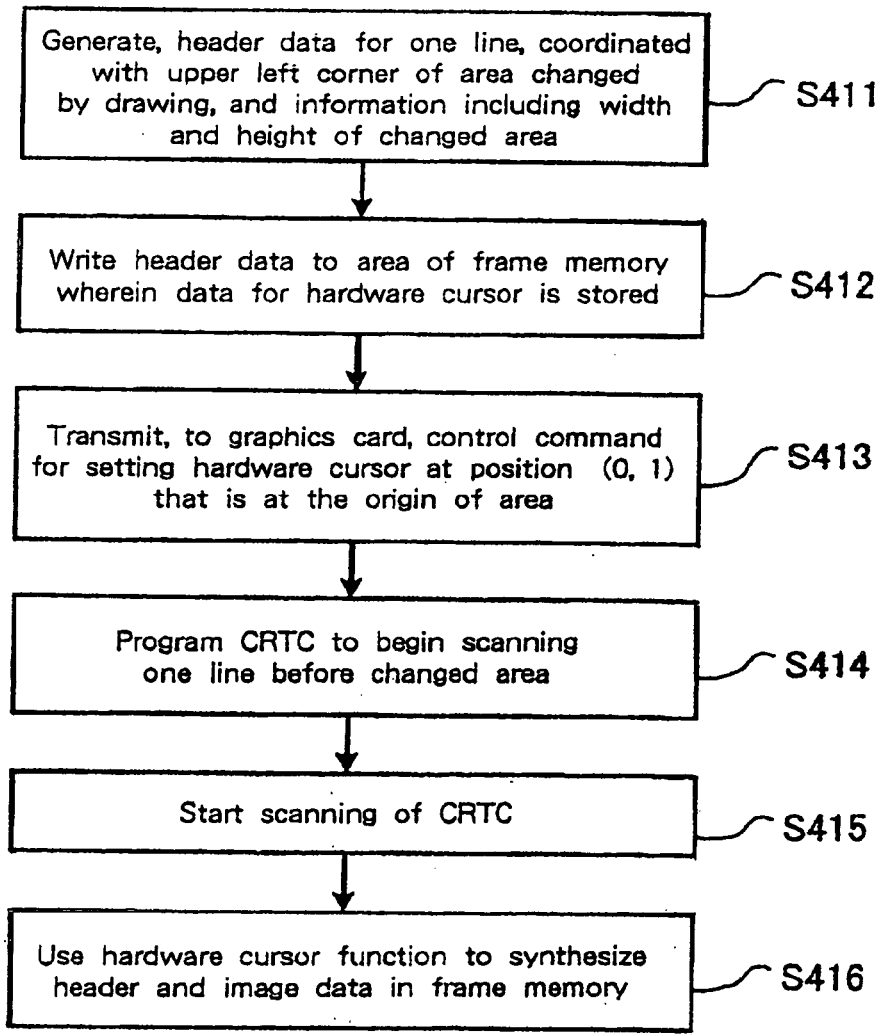

FIGS. 8A and 8B are flowcharts showing the processing performed to generate packet data. In FIG. 8A, the processing performed at the initial setting is shown, and in FIG. 8B, the processing performed for packet generation is shown.

At the initial setting, as is shown in FIG. 8A, first, an area in the frame memory 13 is obtained that is larger than necessary by the equivalent of one line (step 401). Initially, the hardware cursor function 15 is so set that it is valid for the graphics card 12, and invalid for the OS/application 11 (step 402). That is, at the initial setting, the OS/application 11 is notified that its use of the hardware cursor function 15 has been inhibited, and the hardware cursor function 15 is actually used by the graphics card 12.

Figure 7:
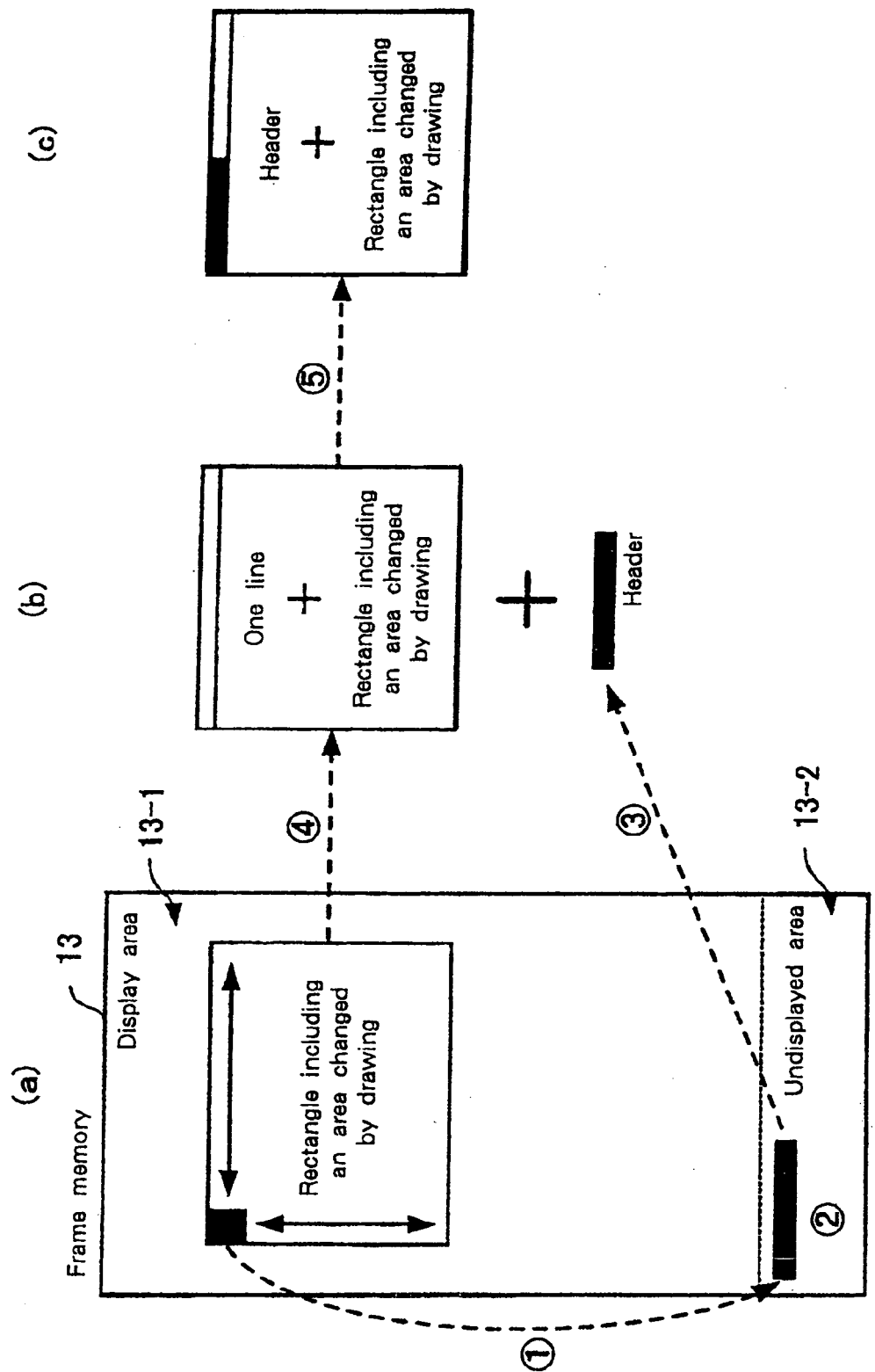
FIGS. 7A to 7C are diagrams for explaining a packet data generation method.

During the generation of a packet, as is shown in FIG. 8B, first, the coordinate at the upper left corner of the area that was changed by drawing, and information that includes the width and height of the changed area are generated as one line of header data (step 411, see □ in FIG. 7). Then, the header data is written to an area in the frame memory 13 wherein the hardware cursor data is stored (step 412, see, in FIG. 7). A control command for setting the hardware cursor at the head location (0, 1) of the area is transmitted to the graphics card 12 (step 413, see ƒ in FIG. 7). The CRTC 18 is programmed so as to start scanning at a position preceding the changed area by one line (step 414, see, in FIG. 7). Thereafter, the scanning of the CRTC 18 is started (step 415), and the hardware cursor function 15 synthesizes the header data and the image data in the frame memory 13 (step 416, see . . . in FIG. 7).

Figure 9:
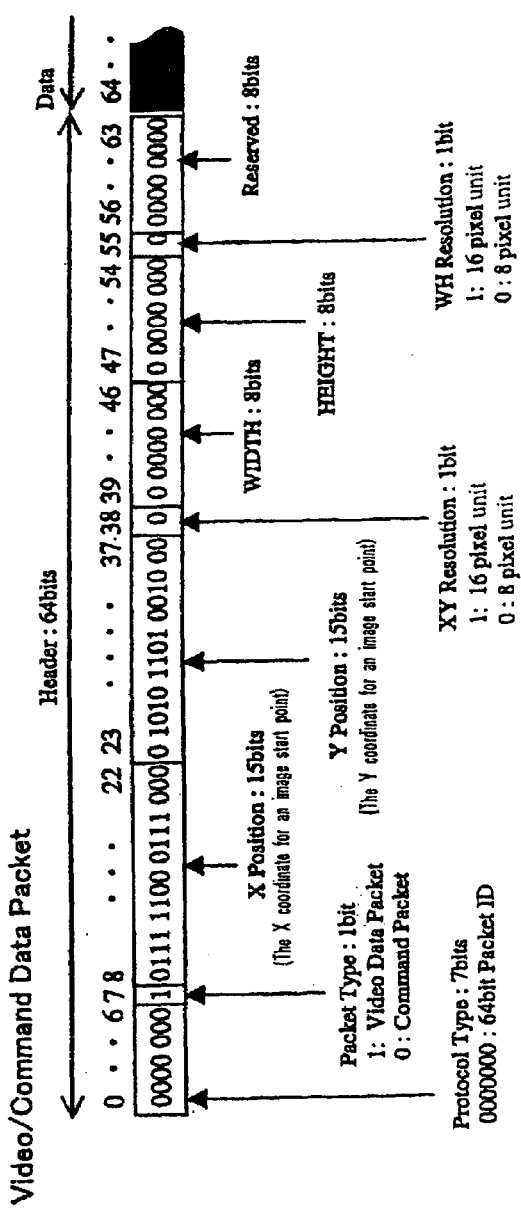
FIG. 9 is a diagram showing an example header format for a packet.

FIG. 9 is a diagram showing an example header format for a packet. The packet header in this embodiment has a length, for example, of 64 bits and is converted into monochrome data having 64 pixels, which are transmitted with the image data by using the hardware cursor function 15. The number of bits used for one pixel varies, depending on the display mode, and in a full color mode (32 bit RGB), for example, one pixel is 32 bits. In this embodiment, header bit "0" corresponds to black ("0000000000000000b" for 16 bit RGB), and header bit "1" corresponds to white ("1111111111111111b" for 16 bit RGB). Since the thus transmitted header data is redundant, when the receiving monitor 40 makes a majority decision, very high error resistance can be obtained compared with the other image portions. Further, with this method, predetermined data for 64 pixels is still maintained even when the display mode is changed, while the bit length is changed to represent a single pixel and multiple display modes can be consistently coped with.

As is shown in FIG. 9, the major components constituting the header of a packet are a protocol ID, and the location (coordinates at a left end point) of a rectangle to be transmitted and the width and the height of that rectangle. In the example in FIG. 9, the header begins at bit 0, while the data portion that follows begins at bit 64. In Protocol Type (ProType), seven bits are used to store the protocol type and the version, and in Packet Type (PacType), one bit is used to designate either a video data packet or a command packet. As the location of the rectangle to be transmitted, the X and Y coordinates of the origin of the rectangle (image starting point) are respectively stored in XPOS and YPOS, 15 bits each, while the unit in the field for the XY coordinates of the origin is stored in XY Resolution, one bit, the width and height of the rectangle are stored in WIDTH and HEIGHT, eight bits each, and the unit in the field for the width and height of the rectangle is stored in WH Resolution, one bit. An additional eight bits are provided in Reserved. An area for storing hardware cursor data may also be written in the header of a packet to be transmitted.

An explanation will now be given for a method according to the embodiment for determining an area to be transmitted.

In the drawing command analysis unit 20 explained while referring to FIG. 3, the transmission target area controller 23 determines which change area included in a list stored in the drawing data DB 22 is to be transmitted. However, since this change area determination greatly affects the quality of the image displayed on the panel 41, in this embodiment roughly two concepts, "collective transmission of drawing results" and "change in transmission order based on display priority levels", are employed to determine which area is to be transmitted.

Figure 10:
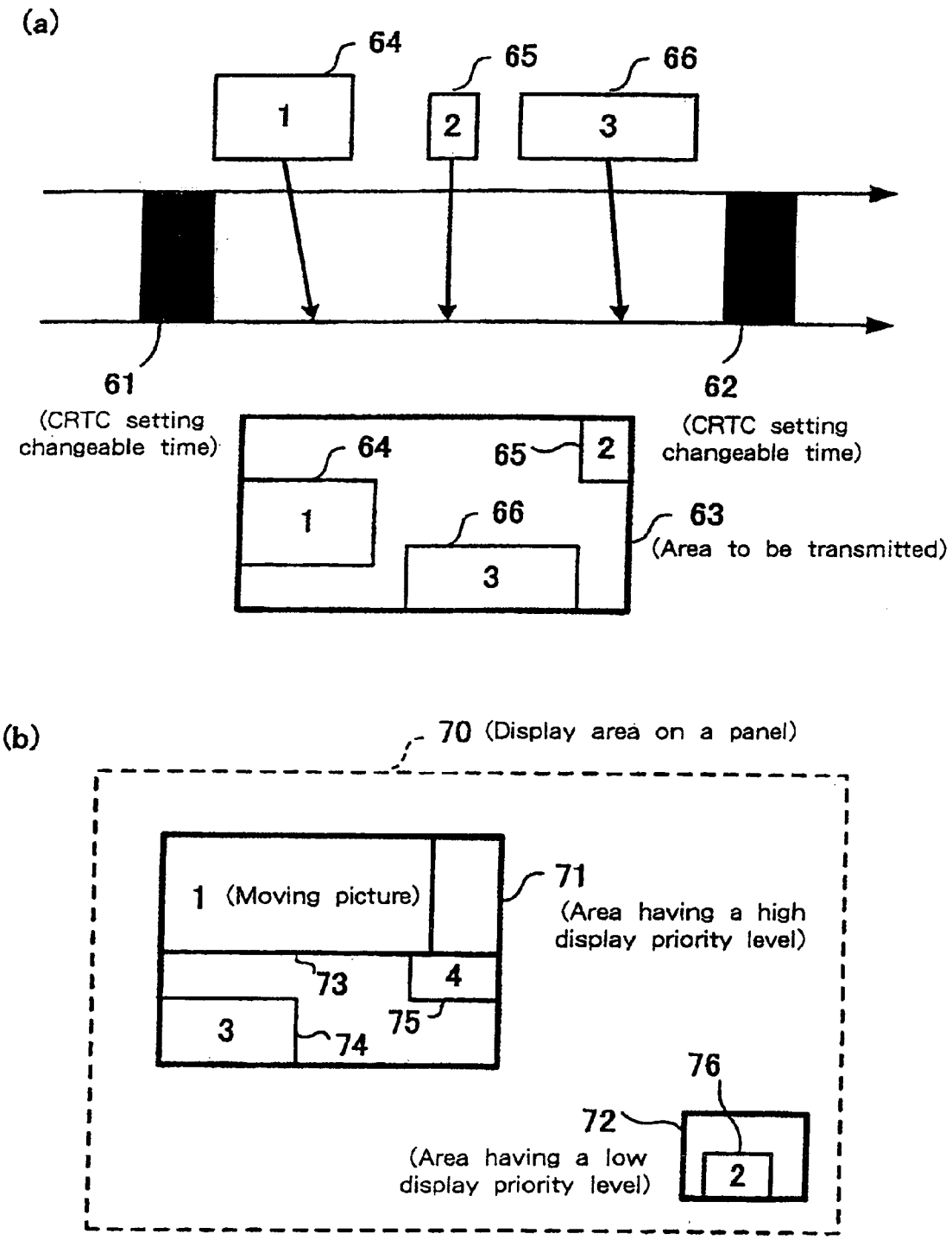
FIGS. 10A and 10B are diagrams for explaining a method for determining an area to be transmitted.

FIGS. 10A and 10B are diagrams for explaining the method used to determine which area is to be transmitted. In FIG. 10A, a collective transmission is shown, and in FIG. 10B, a change in the transmission order based on display priority levels is shown. For the "collective transmission of drawing results", as is shown in FIG. 10A, multiple areas (64 to 66) changed in accordance with a drawing command are transmitted as a single area 63 during a period extending from a first CRTC setting changeable time 61 to a second CRTC setting changeable time 62. The CRTC setting changeable times 61 and 62 are periods reflecting setting changes for the CRTC 18 as its scan area is changed. Generally, CRTC programming for determining an area to be transmitted can be performed only within a limited timing period, such as between vertical synchronization processes. Therefore, instead of transmitting an area each time a drawing command is received, "collective transmission of drawing results" is employed in order to minimize the frequency at which CRTC programming is performed, and to thus improve the overall performance of a system. In the example in FIG. 10A, instead of transmitting only the area 64 or the area 65, collective transmission is employed to transmit all the areas, including the area 66, that are changed during the display of one frame.

In addition, in "change in transmission order based on display priority levels", display priority levels are assigned based on the characteristics of changed areas (in FIG. 10B, an area 71 having a high display priority level and an area 72 having a low display priority level), and the transmission order is then determined. An area 73 that includes, for example, a moving picture frame is an area that has an extremely high change frequency and that a user concentrates on. On the other hand, an area 76 wherein time information, for example, is displayed and that is separate from the area having a high change frequency tends to be less important. As is described above, display importance levels are provided for individual change areas in accordance with the current drawing condition and the characteristics of an application. In the example in FIG. 10B, relative to the display area 70 on the panel 41, the change area 71, which includes the areas 73 to 75, is assigned a high display priority-level in accordance with its characteristics, and the change area 72, which includes the area 76, is assigned a low display priority level in accordance with its characteristics. Therefore, in FIGS. 10B, 3 (area 74) and 4 (area 75), which were received after 2 (area 76), are transmitted first. In this manner, through the processing performed to change the transmission order based on the display importance levels, the overhead related to the updating of the CRTC 18 can be reduced.

To provide display priority levels for rectangles, for example, that have not yet been drawn, a high priority level is provided for an older rectangle;

a high priority level is provided for an area wherein drawing is the most concentrated;

a high priority level is provided for an area wherein the location of a mouse cursor is positioned at the center; and a high priority level is provided for an area wherein an active window is displayed.

When a high priority level is provided for an area that it is assumed a user will concentrate on, an appropriate display for meaningful drawing can be presented.

In addition, in this embodiment, as the transfer order is changed based on the display priority levels, a process for using a slow refresh mode is performed. This full-screen updating mode is a method that differs from a normal method (called as a normal mode) in which an area that is drawn in accordance with the drawing command is dynamically detected and the CRTC 18 is set. That is, regardless of whether a drawing command is issued, the CRTC 18 is set so that periodically a full screen is subdivided into multiple segments and transmitted. For example, when a drawing command has not been issued and there is no change area on a screen, or at an appropriate time interval (e.g., 10 seconds) that is set in advance, even when there is a change area on the screen the normal mode is temporarily changed to the full-screen update mode and a full screen is transmitted.

Generally, when a communication error has occurred, this information is not transmitted to the transmission device 10 unless a considerably long time has elapsed and incorrect information has been displayed for an extended period of time. Because of a characteristic of the monitor cable 39, the communication band width for a transmission by the receiving monitor 40 to the transmission device 10 is extremely small and the communication speed is also extremely low. As a result, it is not practical to constantly wait to receive transfer result feedback from the receiving monitor 40. Therefore, a system is required that can correct an error without depending on feedback from the receiving monitor 40. In many cases, especially when the period a received image has been displayed is unknown at the time of transmission, a system is required that will permit the resolution of a transfer error for an image that has been displayed for only a short period of time as well as the resolution of a transfer error for an image that has been displayed for an extended period of time.

In this embodiment, in the processing for the full-screen update mode, transfer errors more or less occur for images that are constantly changed and are displayed only for short periods of time, while most of the errors that occur can be resolved for an image that is displayed for an extended period of time. In addition, in an environment, such as one wherein the noise level is very high, when the error rate exceeds a predetermined value, the mode is changed to the full-screen update mode, so that a communication error can be resolved.

A detailed explanation will now be given for a method that uses the change area list to determine which area is to be transmitted.

The following methods, which can be employed separately or which can be combined for use, are available for determining an area to be transmitted.

1. One rectangular area, which currently includes all the drawing areas that have not yet been transmitted, is determined to be the area that is to be transmitted next. When this area is so large that all of it can not be transmitted at one time, it is subdivided to provide multiple segments for subsequent transmission.
2. An area selected for transmission is one that it has been determined will enclose the oldest drawn area (e.g., located in the center, the upper left or the upper right), and each time such an area is transmitted, a list of the areas that have not yet been transmitted is updated.
3. An area selected for transmission is one that it has been determined will enclose the latest drawn area, and as each such area is transmitted, a list of the areas that have not yet been transmitted is updated.

However, if after a specific time following the drawing of an area an area to be transmitted has still not been transmitted, the transmission of this area is performed first.

4. For a system having a full-screen updating mode, transmission in the normal mode is not performed for an area having a low priority level until the mode is automatically switched to the full-screen update mode and, it is assumed, the transmission of the changed area is completed during the full-screen updating process.
5. The area wherein the most drawing areas are collected is transmitted.
6. An area wherein the location of the mouse cursor is defined as the center is transmitted first.
7. An area wherein an active window is arranged is transmitted first (Window manager cooperation is required).
8. The full screen is subdivided and the obtained screen segments are transmitted constantly, regardless of the presence of drawing areas.

A system having a full-screen update mode must be studied to determine a predetermined time interval for the switching of modes. Generally, the time interval whereat the mode change occurs is obtained by dynamically or statically determining the following items:

the rate whereat errors occur along the transfer path
the size of the panel 41
the size of the screen that the CRTC 18 can scan at one time
the characteristics (the drawing size and the image updating frequency) of an application that is currently being executed This time interval is extended to accommodate the size of a moving picture that can be displayed without moving the CRTC 18. However, for a process such as photo retouching, for which static images are mainly displayed, and for the presentation, using a full screen, of an image that closely corresponds in size to an entire static image, the time interval is extremely short. Further, a system provided for another component may correct this time interval. When, for example, the full-screen update mode is used to update a changed area having a low transmission priority level, the time interval set for changing the mode must be shorter than the normal interval.

While employing this arrangement in this embodiment, various problems were studied.

As a first problem, for the transmission of a rectangular image and a header, only specific rectangular information and specific commands need be transmitted by the transmission device 10 to the receiving monitor 40. This function, however, must be carried out without any changes in the conventional graphics card 12, and in this embodiment, only a targeted rectangular area can be output using the hardware panning function 14.

As a second problem, to synchronize a header with an image, image control data must be embedded as a header in image data. At this time, it is preferable that the system overhead be removed without reducing image quality, and that a large, additional investment not be required.

As a general solution using software, one method provides for the development of header data in advance inside, or in the vicinity, of an area in the frame memory 13 that is to be transmitted, and for transmitting the header data with the image data. As an example method, header data is written in front of and separated by the equivalent of one line from an area to be transmitted, so one extra line is added to a rectangular area that is transmitted. With this method, a process is required for storing the original image before the header data is written, and for returning the data to their original location after the image transmission has been completed. Since during this process the writing of the header data and the writing and the transmission of the drawing engine 17 must be exclusively allocated for use by the frame memory 13, a large overhead is built up. Thus, when the system of the invention is employed, drawing time or data transmission time must be shortened considerably, which can drastically deteriorate the quality of the image displayed on a monitor.

Another method for resolving the synchronization problem provides for the preparation of special hardware having a function that can easily perform the header/image synchronization process while using an OS or a driver. However, since this method would require that extensive alterations be made by graphics card vendors, it is not a practical solution.

In this embodiment, since the hardware cursor function 15 is used differently from originally intended, alteration of data in the frame memory 13 is not required, and the header/image synchronization problem can be resolved without any special hardware being required.

As a third problem, an increase in overhead occurs when an area to be transmitted is changed. As an example corrective method, an order can simply be issued for the use of a drawing command, and this area change (CRTC programming) will be performed for each image that is drawn. When this method is used, however, the processing time is increased, and a satisfactory frame rate can not be obtained.

Therefore, as a solution in this embodiment, upon receiving individual drawing commands, the drawing command received by the graphics device driver 24 is hooked, and an area that is affected by this command is calculated and information concerning this area is stored. For example, the logical sum of circumscribed rectangles in the drawing area designated by each drawing command or the circumscribed rectangles are stored. Then, at a periodical timing that is triggered by a vertical synchronization signal interrupt or a timer, the optimal position of the CRTC 18 is determined based on the stored data, and a correlated register is set.

As a result, several drawing results need not be transmitted separately and can be transmitted as a single rectangle, while the increased overhead produced when the CRTC 18 is programmed can be reduced.

As a fourth problem, the drawing process performed by the drawing engine 17 and the transmission process performed by the CRTC programming must be synchronized. The drawing command analysis device 20 detects a drawing command that the OS/application 11 issues, and specifies a changed area. The drawing command is then transmitted to the drawing engine 17 of the graphics card 12, and drawing is performed in the frame memory 13. At this time, since normally there is no way to determine when the drawing engine 17 has completed the drawing, before the drawing has been completed the system will perform the CRTC programming and an image from a specified area will be transmitted. However, in this case, only a meaningless image is transmitted.

To solve this problem, in this embodiment, the drawing command analysis device 20 detects a drawing command, and at the same time, permits the drawing engine 17 to write a sequence number to an undisplayed area prepared in the frame memory 13. Thereafter, the sequence number of the pertinent area is read from the frame memory 13, and how far the drawing command queue that was issued has been processed can be determined. As a result, transmissions are performed only within a range wherein drawing has been completed.

As is described in detail, in this embodiment, an image display system is provided that comprises: the transmission device 10, which extracts a changed area and transmits data for this area and header data that includes image control data; and the receiving monitor 40, which includes the frame memory 53 and which analyzes and displays a received image, and that basically performs a delta transmission. With this system, while an investment, such as the addition of a graphics card 12, is not required for the transmission device 10, which is a conventional PC, only an extremely small change need be added to drive, with a limited transfer bandwidth, the panel 41, which is a large, high-resolution monitor.

In this embodiment, a transmission area selection method is adopted that employs the hardware panning function 14 used for a conventional graphics card 12, and the hardware cursor function 15 is used to embed the header data. Further, a collective transmission method is used to cope with multiple changed areas in order to reduce the increase in the overhead that occurs as a result of the panning area being changed. In addition, synchronization of the drawing data and the data in an area to be transmitted is accomplished by using a signature that is written to the undisplayed area of the frame memory 13 on the transmission device 10. Thus, transfer efficiency and display quality can be considerably increased.

Furthermore, in this embodiment, a refresh mode for repetitively transmitting the same screen is prepared in addition to the normal mode for transmitting only a rectangular portion wherein drawing is performed. And communication error control between the transmission device 10 and the receiving monitor 40 is implemented by switching from the normal mode to the refresh mode under a specific condition, such as one wherein the operation is not performed in the current mode for a specific period of time. Since this communication error control is exercised, the conventional image quality problem of a system that performs a delta transmission is resolved. As a result, a QXGA size or larger, high quality image can be displayed while employing a limited communication path (e.g., a single monitor cable 39).

Moreover, in this embodiment, the power consumption of the receiving monitor 40 can be reduced compared with a conventional display system, and the system of this embodiment is also advantageous when applied for a mobile terminal, or for the simultaneous use of multiple panels by an apparatus such as a multi-display device. Further, when no transmission errors occur or while no drawing is being performed, the communication related portion in the circuit associated with the monitor cable 39 is powered off, so that power consumption is further reduced.

As is described above, according to the present invention, a large, high-resolution monitor (panel) can be driven merely by adding an extremely small change to a conventional system.

The invention claimed is:

1. An image display system, comprising: a transmission device, for transmitting image data based on a predetermined drawing command; and a receiving monitor, for displaying received image data on a display panel, wherein said transmission device includes a transmitter frame memory, area detection means, for detecting an area wherein a change occurs on a screen in accordance with said drawing command, transmission target area calculation means, for calculating, based on said area detected by said area detection means, a target area to be transmitted, and packet transmission means, for transmitting a packet that includes said target area that is obtained by said transmission target area calculation means, and control data for said target area, and wherein said receiving monitor includes analysis means, for analyzing said control data received from said packet received from said transmission device, a receiver frame memory, for composing image data based on said control data analyzed by said analysis means, and display means, for displaying, on a display panel, said image data rendered in said receiver frame memory, wherein said packet transmission means adds, to said target area, header data that is composed of said control data, and transmits the resultant data as said packet to said receiving monitor, wherein said image data of said target area to be transmitted is stored in a displayed area in said transmitter frame memory and said header data is stored in an undisplayed area in said transmitter frame memory wherein no image data are stored.

2. The image display system according to claim 1, wherein, regardless of whether a change occurs on said screen, said packet transmission means repetitively transmits a packet including the same screen data.

3. An image data transmission apparatus for, upon receiving a predetermined drawing command, transmitting image data to a receiving monitor comprising: a drawing command analysis device, for determining whether there is an area to be changed by said drawing command, for calculating a target area to be transmitted, including said area to be changed, and for outputting a drawing command and control data for an area data controller relative to said target area to be transmitted; and a graphics card, for performing drawing in a frame memory upon receiving said drawing command from said drawing command analysis device, and for employing said control data for said area data controller to read from said frame memory an area to be transmitted, to said receiving monitor, and for outputting said area, wherein said image data is stored in a displayed area in said frame memory and header data concerning said area to be transmitted is stored in an undisplayed area in said frame memory wherein no image data are stored, and wherein, In order to output image data included in said area to be transmitted, said header data is read from said undisplayed area and is added to image data included in said area to be transmitted.

4. The image data transmission apparatus according to claim 3, wherein, in response to the reception of a predetermined interrupt signal, said drawing command analysis device outputs said control data for said area data controller.

5. The image data transmission apparatus according to claim 4, wherein said predetermined interrupt signal is a vertical sync signal.

* * * * *